US00RE44593E

(19) United States
(12) Reissued Patent
Molitor

(10) Patent Number: US RE44,593 E
(45) Date of Reissued Patent: *Nov. 12, 2013

(54) METHOD AND APPARATUS FOR FACILITATING PEER-TO-PEER APPLICATION COMMUNICATION

(75) Inventor: Andrew T. Molitor, Norfolk, VA (US)

(73) Assignee: Alcatel Lucent, Paris (FR)

( * ) Notice: This patent is subject to a terminal disclaimer.

(21) Appl. No.: 13/340,938

(22) Filed: Dec. 30, 2011

Related U.S. Patent Documents

Reissue of:
(64) Patent No.: 6,661,799
Issued: Dec. 9, 2003
Appl. No.: 09/661,070
Filed: Sep. 13, 2000

U.S. Applications:
(63) Continuation of application No. 11/299,236, filed on Dec. 9, 2005, now Pat. No. Re. 43,057.

(51) Int. Cl.
*H04L 12/28* (2006.01)

(52) U.S. Cl.
USPC ..... 370/401; 370/466; 370/492; 726/3

(58) Field of Classification Search
None
See application file for complete search history.

(56) References Cited

U.S. PATENT DOCUMENTS

| | | | | |
|---|---|---|---|---|
| 5,227,778 | A | 7/1993 | Vacon et al. | |
| 5,781,550 | A * | 7/1998 | Templin et al. | 370/401 |
| 5,793,763 | A | 8/1998 | Mayes et al. | |
| 6,006,272 | A | 12/1999 | Aravamudan et al. | |
| 6,038,233 | A * | 3/2000 | Hamamoto et al. | 370/401 |
| 6,047,325 | A | 4/2000 | Jain et al. | |
| 6,055,236 | A | 4/2000 | Nessett et al. | |
| 6,058,431 | A | 5/2000 | Srisuresh et al. | |
| 6,128,298 | A * | 10/2000 | Wootton et al. | 370/392 |
| 6,128,664 | A * | 10/2000 | Yanagidate et al. | 709/228 |

OTHER PUBLICATIONS

NAT Working Group, Internet Draft (Informational), P. Srisuresh, Campio Communications, Jul. 2000.

* cited by examiner

*Primary Examiner* — Bob Phunkulh
(74) *Attorney, Agent, or Firm* — Dorsey & Whitney LLP

(57) ABSTRACT

A system for performing Network Address Translation, which allows applications to request information concerning address translations to be performed, so that those applications may send useful information to other applications for the purposes of allowing applications to communicate through the NAT device in the absence of statically defined rules for specific channels of communication.

31 Claims, 3 Drawing Sheets

METHOD AND APPARATUS FOR FACILITATING PEER-TO-PEER APPLICATION COMMUNICATION

Matter enclosed in heavy brackets [ ] appears in the original patent but forms no part of this reissue specification; matter printed in italics indicates the additions made by reissue.

*This application is a second, continuation reissue application of first, U.S. patent Reissue application Ser. No. 11/299,236, filed Dec. 9, 2005, of U.S. Pat. No. 6,661,799, to be re-issued as U.S. Pat. No. Re. 43,057, the content of all of which is hereby incorporated in its entirety by reference. More than one reissue application has been filed based on U.S. Pat. No. 6,661,799. Reissue application Ser. No. 11/299,236, filed Dec. 9, 2005, of U.S. Pat. No. 6,661,799 is the parent of this continuation reissue application.*

BACKGROUND OF THE INVENTION

1. Field of the Invention

This invention relates to devices for handling communications between applications exchanging data over the Internet. More particularly, this invention relates to a Network Address Translation (NAT) device and a system and method using such NAT device for facilitating peer-to-peer communication of data over the Internet.

2. Description of the Prior Art

As shown in FIG. 1, a Network Address Translation (NAT) device 20 of the conventional kind is usually placed within an Internet Protocol (IP) network at the border between two disparate address realms 50 and 30. One realm 50 may be a private organization's internal network 10 and the other realm 30 may be the public global Internet. The problem addressed by such a conventional device is that an organization may require a large internal network, with many devices on it, each device requiring a unique IP address. In view of the currently available address space for unique IP addresses ($2^{32}$ available addresses) and present address allocation patterns, this organization may be unable to have allocated to it a sufficient number of official IP addresses, by the authorities that assign such addresses. Therefore, the organization is effectively forced to make up internally valid addresses for its own internal network. This will allow the internal network to function correctly; there is no requirement to use officially assigned IP addresses in such a context. The difficulty arises when devices or applications (programs running on a particular device) in the large internal network need to communicate with the Global Internet (by which we mean any IP network, public or private, using officially assigned IP addresses). Because the addresses assigned internally by the organization either overlap with officially assigned addresses belonging to some other organization, or are officially unassigned, the Global Internet cannot use these to send data correctly into the organization's internal network. In order to send data to a network-attached device, for example, the sending application must have an address for the target application, and the network receiving the data itself must know how to locate the target application. These operations work only if all applications involved are in agreement regarding what IP addresses belong to what devices and applications.

One solution is for the organization to have allocated to it some set of official IP addresses. These are unique addresses. Any application on the Global Internet sending data to these addresses may rely on that data arriving at the entrance to the organization's internal network. That is, the Global Internet infrastructure will correctly deliver data to the organization, and then (as is the normal case with IP) rely on the organization to locate the right endpoint application inside the organization for final delivery.

The organization could then assign each of the official IP addresses it has been allocated to an individual application for an indefinite period, allowing a lucky few applications Internet access. A better solution, allowing wider access, is to use a device that can, in effect, assign the officially allocated IP addresses dynamically to whichever applications need access to the Global Internet at any given time. Addresses are recovered from applications no longer using them, and made available for reassignment. This sharing system works very well and is, in the simplest form, exactly what a conventional NetworkAddress Translator (NAT) usually does. (See RFC 2663 IP Network Address Translator (NAT) Terminology and Considerations, published by the Internet Engineering Task Force (IETF). This is the basic IETF document describing the operation and issues surrounding NAT devices.)

Often, an organization will be assigned some very small number of official IP addresses. Perhaps as few as 31, or 255 such addresses may be given to an organization. For an organization with thousands of applications on its internal network, a naïve NAT, able only to assign official IP addresses, may not be enough. If only 31 of, say, 5000 applications (each of which might correspond to an individual employee) can be using the Global Internet at once, the problem may not be considered fully solved.

In order to effectively expand the useful size of the officially allocated address pool, the organization's NAT will usually have the ability to use the same official address for multiple internal applications. Data arriving for a specific official IP address, say, X, may be further distinguished by belonging to one of several data streams, say A, B and C. The NAT may have assigned address X, stream A to a specific data stream for one application, while address X streams B and C belong to two different, other applications.

The stream identifiers are called port numbers. A stream of data in an IP network is uniquely identified by the so-called "5-tuple", which consists of 5 separate numeric quantities:

1) Source IP address
2) Destination IP address
3) Source Port Number
4) Destination Port Number
5) Transport Protocol Every data item (packet) in an IP network has these 5 numeric identifiers in it. The two IP addresses (items 1 and 2 above) identify, more or less, the source and destination applications. The protocol identifies which of the mechanisms for ensuring reliable transport of data are being used. For present purposes the protocol is ignored, because it is not something a NAT does much with. The source and destination ports (items 3 and 4 above) identify which application within the network sent and is to receive, respectively, this packet.

A conventional Network Address Translator (e.g., a Private Internet Exchange (PIX), made by Cisco Systems, Inc. of San Jose, Calif.) as viewed by this document operates by altering these five numeric identifiers within a packet. As noted above, a NAT device resides at the boundary between two address realms, usually, but not always, the Global Internet and an organization's private network, where these two networks have incompatible IP addressing schemes. A NAT device uses intelligent re-writing of the four source/destination elements within each packet flowing through it, to present to each of the two networks a false but compatible view of the other network's IP addressing scheme. Each NAT must have a set of rules defining the internal address-external address pairing it will use for address translation. A useful NAT must build these pairings to allow internal applications to make effective use of available external addresses, which will be limited if the external realm requires official IP addresses.

A conventional NAT device associated with an internal network supports, essentially, two concurrent modes of operation. The first allows data transactions from applications on the internal network outwards to the Global Internet (for example, a corporate user accessing a web page). This is an Internal Client to External Server access. The second allows applications on the Global Internet to access specific services on specific devices on the internal network (for example, a customer accessing an organization's web site). This is External Client to Internal Server access. The way in which the conventional NAT device builds the address pairing that allows the first and second type of access are somewhat different.

A conventional NAT device implements the first mode as follows: when the initial packet of a data transaction arrives on the NAT device outbound, the NAT device examines the source address and port (which identify the internal device and the application that originated the packet). The NAT then chooses from its pool of available official addresses and ports an externally-valid IP address and port to use in place of the internally-valid source address and port in the packet. The mapping from the internally-valid source address and port to the externally-valid source address and port is maintained somehow within the NAT, for example, in a table defining the correspondence rule. Finally, the NAT modifies the internally-valid source address and port fields in the outbound packet, and sends it on. When an inbound reply packet, responding to the initial packet, turns up at the NAT from the outside, the destination address and port in the reply packet will match the externally-valid source address and port (because in a reply, naturally, the sender address and the recipient address change places, exactly as with, say, a postal letter). The NAT uses this incoming externally-valid source address and port to locate the internally-valid source address and port from the initial, outbound packet. The NAT then uses the located, internally valid source address and port to replace the destination address and port in this incoming reply packet. Now the incoming reply packet has the correct internally-valid destination address and port for delivery to the device and application which sent the initial outbound packet.

A conventional NAT device implements the second mode using fixed internal-external address correspondence configuration information, defined by the person administrating the NAT. For this mode, the initial packet will be incoming, arriving at the NAT from the outside, with some destination information containing an IP address among those officially allocated, because these externally-valid addresses are the only IP addresses the Global Internet can use to deliver packets to the target organization with the NAT. The NAT at the target organization consults its configuration information to determine which (fixed) internally-valid destination IP address and port it should use to replace the externally valid destination address and port contained in the incoming packet. In effect, if an application (say, a web server) is present at the target organization on internal device A (a non-official, but internally-valid IP address), expecting packets on port X, the NAT might be configured to recognize that packets addressed to IP address M (officially assigned and externally-valid), port Y should be re-addressed to the internally-valid address, device A/port X. Another application at the target organization might be running on another internal device, externally identified as device B, at port Z, and the NAT might use an internal-external address pairing for this application using the same internal address A and some other port, again according to some fixed, pre-defined configuration data.

The difficulty is that the first mode only allows Internal Clients to send data to (and thereafter receive data from) External Servers, while the second only allows External Clients to send data to (and thereafter receive replies from) a small set of Internal Servers at fixed IP addresses and ports, pre-defined in the NAT associated with the Internal Servers. Transactions in which an External Client connects to a just-created Internal Server at a just-allocated port number are not supported.

A variety of prior art references discuss NAT devices and variations on their basic address translation functions:

U.S. Pat. No. 6,055,236, titled "Method And System For Locating Network Services With Distributed Network Address Translation," covers methods for, in effect, advertising a service securely. U.S. Pat. No. 6,055,236 is silent on the symmetrical issue of providing addresses for Client-side information, focusing entirely on advertising externally useful addresses for servers and saying nothing regarding external addresses to be used by clients.

U.S. Pat. No. 5,793,763, titled "Security System For Network Address Translation Systems" is a patent on a NAT device of sorts, except that it only translates IP addresses and it is concerned with security considerations. There is nothing taught on the subject of using port numbers to expand the "logical" address space available.

SOCKS. SOCKS is an Internet Engineering Task Force (IETF) standard, which provides a mechanism by which an application can query an application firewall as to an externally useful address which it can advertise to a remote client application. SOCKS is this application's proxy, which provides services similar to a NAT, but operates quite differently. Rather than re-writing the packet contents as it flows through the device, SOCKS (like any application proxy) will terminate two communication channels, and logically connect them together at a high layer inside itself. For example, a server on the inside of a network might start its service, and then make a request to a SOCKS application at the edge of the network. The SOCKS application will start a "thin" server on its host, at the network edge, and then inform the original server of the address and port at which the "thin" server may be found. The original server can communicate this information to the client, which connects to the "thin" server which SOCKS is operating. SOCKS will then connect to the original server as a client, and then copy data received from the external client to the original server, as well as copying data received from the original server back out to the external client. In particular, SOCKS is not a NAT and does not operate packet-by-packet, which has certain performance and scaling implications. For more information on SOCKS, see http://www.socks.nec.com.

It is expected that there will be an increase in use of IP networks to send data that consists of digitized voice, sound or video ("media" content). What is needed is a method and apparatus for network address translation facilitating peer-to-peer data exchange, including media transmission, over the Internet and other IP networks.

SUMMARY OF THE INVENTION

This invention comprises a network address translation device for facilitating communication between a first application in a first address realm and a second application in a different address realm. The device uses an address translator for translating an address valid in the first address realm into an address valid in the second address realm, based on a translation rule and for translating the address valid in the second address realm into the address valid in the first realm. It also uses an address manager for establishing a translation rule by associating an address valid in the first address realm with an address valid in the second address realm. There is a control channel communicating with the address manager for receiving from the first application a request for an address valid in the second address realm to be associated with a specified address valid in the first realm and for providing the first application access to the address valid in the second address realm to facilitate communication of the address valid in the second realm to the second application.

In one embodiment of the invention the applications are entities connected for IP telephony. In another embodiment of the invention the address manager establishes more complex translation rules such that an externally valid destination address could be translated into an internally valid address of one value or a different value depending on the incoming source address. Specific remote addresses, larger sets of remote addresses, or any remote address at all could be used as the triggers for the use of special, more complex NAT rules. In a further embodiment an application is programmed to control, within specified ranges, the translation rules established by the address manager.

DETAILED DESCRIPTION

I. Peer-to-peer Applications

A system using the present invention is useful for, at least, the new class of Internet applications that operate in a peer-to-peer (two or more devices located anywhere and communicating essentially symmetrically) fashion as opposed to the traditional model in which one device is at a well-known location (IP address), and the other may or may not be located at a well-known location (IP address).

The new generation of Internet Applications such as IP Telephony, Instant Messaging, and so on, allow users on networks in different address realms to connect directly to one another's computers to share data or to collaborate, or just to chat in a continuous, real-time interaction. In these protocols, each user's computer will set up an application that might be termed a micro-server, and then communicate to the other computer, located in a different address realm, an IP address and port at which that micro-server can be reached. (This is the "just-created Internal Server" at the "just-allocated port number" which a conventional NAT device does not handle). To complete the peer-to-peer connection, each user's computer then launches a client application to connect to the micro-server in the other's address realm. The respective client applications must then be put in possession of an address at which the micro-server on the other computer in the other's address realm can be reached. Thereafter, two-way communication between the two client/micro-server pairs can commence, using the NAT to handle the different address realms.

Figure 1:
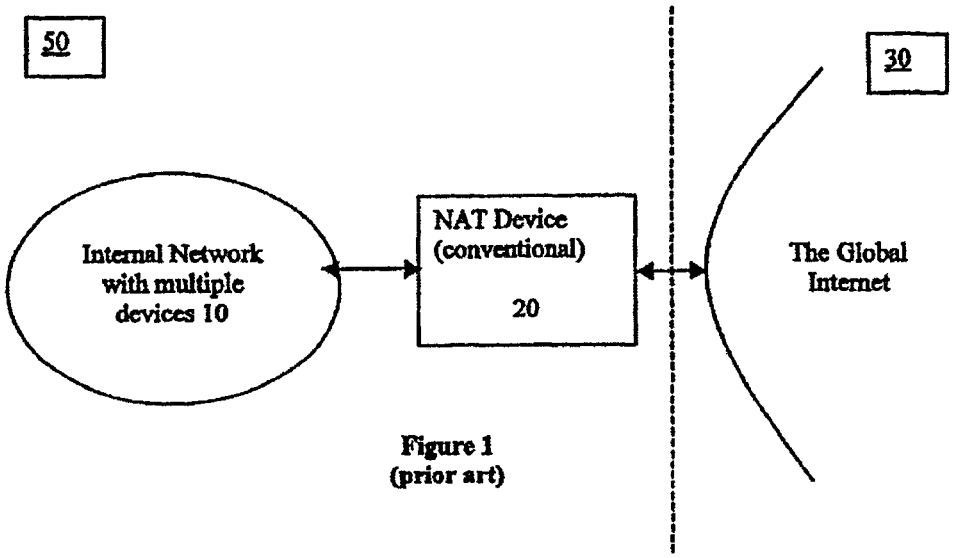
Figure 1 (prior art)
FIG. 1 is a block diagram showing a NAT device as used in a prior art network to connect an internal network with multiple devices or applications to the Internet.

As noted above, FIG. 1 shows the context in which a conventional NAT is used. The general problem usually to be solved is that of a large internal network 10, existing in a realm 50 of un-official, or un-assigned, IP addresses, which are unknown to, or will not be correctly routed by, the Global Internet. The NAT device 20 is deployed at the interconnect point (or points) of the internal network 10 to the Global Internet 30. Using a small pool of officially assigned addresses, the NAT 20 creates the illusion, to the Global Internet 30, of a small network of devices using the officially assigned IP addresses, and provides some access to the Global Internet 30 to many or all of the devices within the internal network 10.

Figure 2:
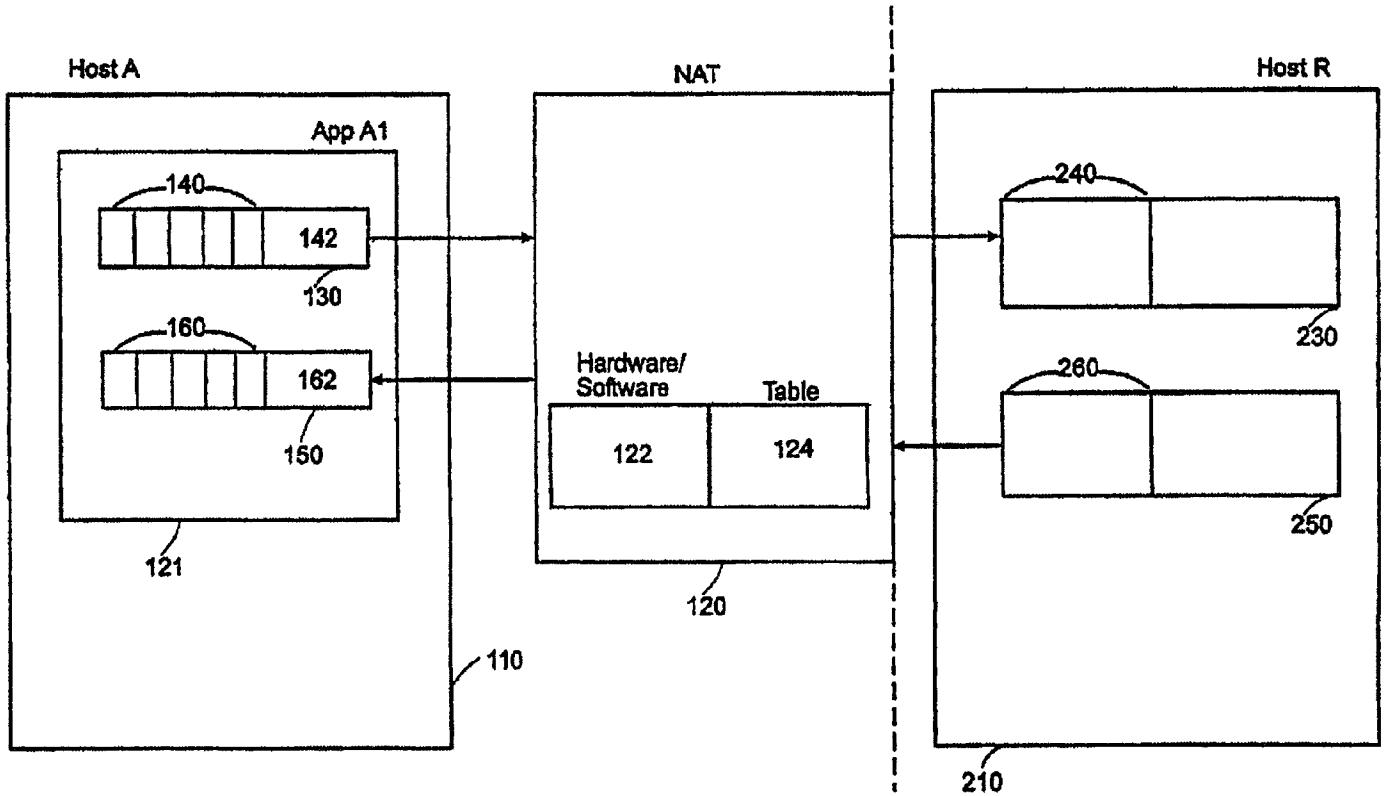
Fig. 2 Prior Art
FIG. 2 is a block diagram showing a NAT device performing address translation according to the prior art.

Peer-to-peer applications will not work through a current generation NAT device, in part because of the limited way an application and its corresponding NAT communicate. Normally, a NAT device deals only with the IP address fields of message packets, performing address translation according to a limited set of rules. FIG. 2 shows the basic address translation functions of a conventional NAT 120. Host A 110 is part of an address realm 100 serviced by conventional NAT 120. Application A1 121 is running on Host A. It has a destination or terminating address that is internally valid and is used to get incoming message packets routed to it. Application A1 also may have an originating address that is used to identify Application A1 as the source of message packets that Application A1 originates. As discussed above, an IP message packet includes a five part IP header. Thus, an outgoing packet 130 that Application A1 desires to send to Host R 210 in a remote, external address realm, will have the following components in its IP header 140:

1) Source IP address
2) Destination IP address
3) Source Port Number
4) Destination Port Number
5) Transport Protocol This IP header is followed by data 142, which may be media. When Application A1 presents outgoing message 130 to NAT 120, the NAT 120 must replace any internally valid addresses and port numbers with externally valid addresses and port numbers. The NAT 120 may have hardware and software 122 that apply its translation rules, stored in any form, such as a correspondence table 124. Typically, Application A1 121 is in possession only of its internally valid Source IP address and Source Port Number (its originating address) and the NAT 120 must translate these as inserted in any outgoing message 130 into an externally valid address header 240 for packet 230 before transmitting them on to Host R 210. If we assume for simplicity that Host R is in an address realm 200 that uses official IP addresses, no NAT or address translation is needed for it to deliver packet 230 with the externally valid address header 240 to the specified destination IP address and port in Host R's address realm 200.

Host R's reply packet 250 will use externally valid IP addresses in its address header 260. The NAT 120 will need to translate these externally valid addresses into internally valid IP addresses for its address realm 100. Again, the NAT will use hardware and software 122 that apply its translation rules, stored in any form, such as a correspondence table 124. The result transmitted to. Host A from Host R is an internally valid packet 150 with appropriately-translated address header 160 that has an internally valid destination address and port, (i.e., the terminating address for Application A1). This permits the internally valid packet 150 with data content 162 to reach Application A1.

The micro-servers for the peer-to-peer communication facilitated by the present invention reside, potentially, on any host device within an organization's internal network. These micro-servers generally will be assigned a random, available port number by the underlying operating system (in an operating system specific way) as the port to use for its service; this will be a number currently not in use by any other application on the host device where the micro-server runs. Indeed, there is no reason the micro-server needs to reside on the same device as the application communicating the micro-server's address, nor is there a need for the micro-server's client in the other address realm to reside on the same device as the device to which the micro-server's address is to be communicated to set up data exchange. However, if this separation does occur, some intra-network communication must occur so that all the applications will know all the address and port information they need to know.

We will refer to the class of applications discussed herein as "peer-to-peer applications," which is intended to cover all applications in which two applications communicate over a network in an essentially symmetric fashion, where neither application is clearly a server or a client in the sense of an application providing a service or receiving a service, respectively; rather, both applications perform the same or similar functions on behalf of the other. Note that throughout the rest of this document we use the term "client" to mean an application which initiates a data transfer session, and the term "server" to mean an application which accepts the initiation of a data transfer session from a client. This is convenient terminology, which helps to define in which direction the initial data packet passing between two applications passes. This initiation step is important for a discussion of NAT behavior. For our purposes, unless otherwise stated, the term "client" will mean the application or device sending the initial session packet of a data transfer, and "server" will mean the application or device to which that initial packet is directed.

IP Telephony is an important example of a peer-to-peer application. In this example each endpoint application acts as a client by initiating a so-called "media" connection to send packets containing digitized voice to the other, which receives the packets containing digitized voice as a server. The relationship is more or less symmetrical, as digitized voice normally passes in both directions.

In IP telephony, a micro-server on an internal network (say, an IP telephone awaiting a stream of digitized voice packets from a remote telephone) will usually need to communicate its host device's IP address to a remote client (the other IP telephone, or some other device, such as a virtual PBX or other IP telephony gateway acting on behalf of the other telephone). The micro-server's internally valid network address won't work for a client on the Global Internet, because this address is not an officially assigned IP address. In the event that the micro-server could somehow independently discover or compute an official IP address, which it could communicate to the remote client in the initial packet, the conventional NAT would still have no procedures or rules for what to do with the first reply packet as sent by the remote client application. That is, unless, the NAT itself took part in this discovery or computation of the official IP address in the initial packet, the NAT will have no translation rule associating the internal network address and any official IP address in an incoming message.

II. An Improved Peer-to-peer Network Address Translation Device

Figure 3:
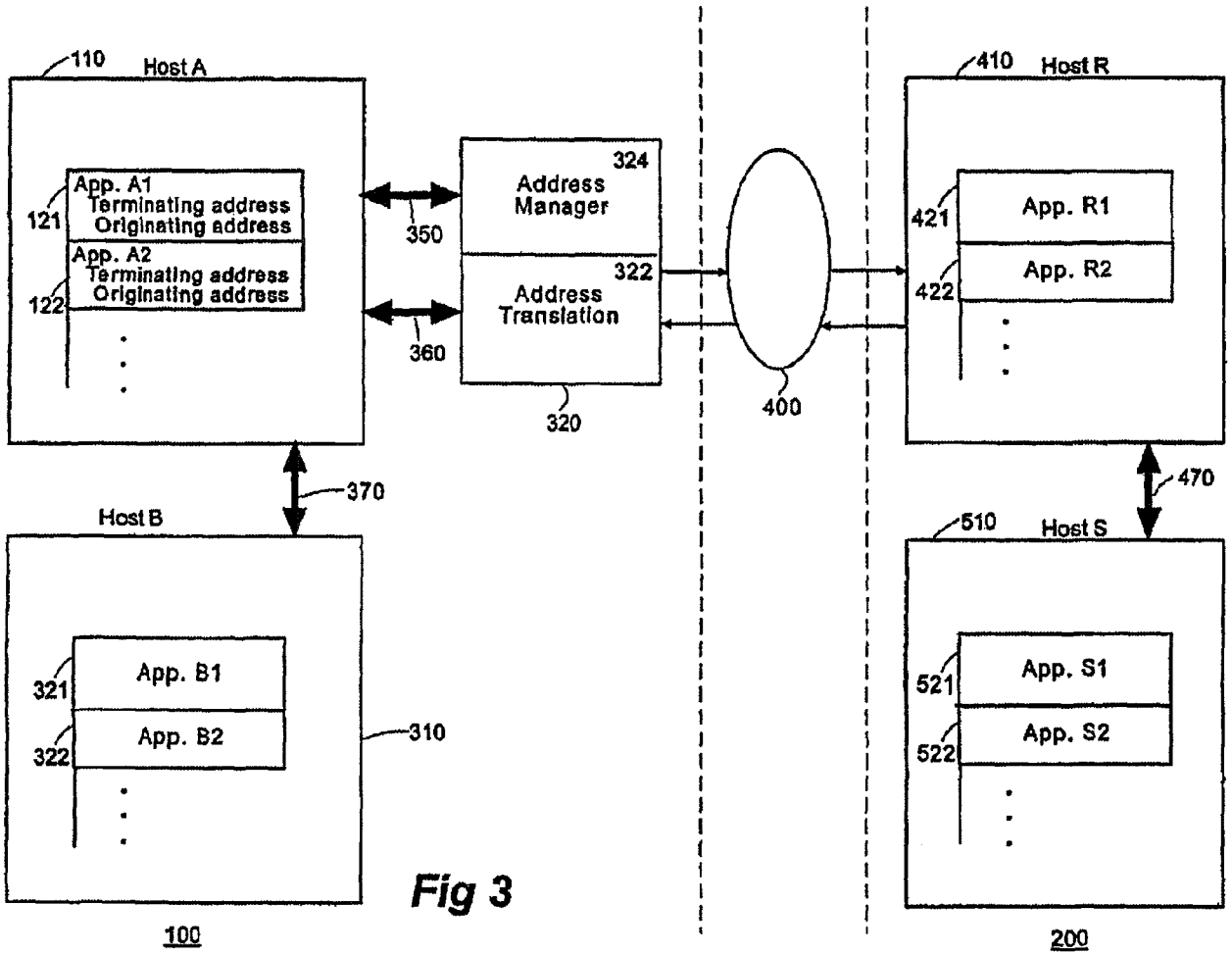
FIG. 3 is a block diagram showing a NAT device according to an embodiment of the present invention for facilitating communication between an application in the address realm served by the NAT and an application in another address realm.

The following discussion makes reference to FIG. 3 to describe how the present invention uses an improved NAT device and method to establish peer-to-peer Internet communications.

Efficient peer-to-peer application communication between different address realms requires that the applications (for simplicity, we will confine discussion to two applications exchanging data between them, as opposed to a one-to-many or many-to-many exchange) have access to the official, externally-valid IP address information that will be used in their communication. In the simplest case, a first application needs to have access to (1) the externally-valid address information others will use to reach it, so that such first application can communicate that address information to a second application in another address realm, and (2) the externally valid address of the second application. In fact, for symmetry and to facilitate security and other functions, it is better that each of the first and second applications has two addresses: an originating address $A_O$, used to identify the device and port of a sending application as the source of an outbound message packet, and a separate terminating address, $A_T$, used to identify another device and port that will receive inbound message packets. Thus, ideally communication is established by each of the first and second applications having and communicating two associated official addresses: originating and terminating. In addition, each of the first and second applications has access to the originating and terminating addresses of the counterpart with which it wants to have peer-to-peer communication.

FIG. 3 shows a system for facilitating improved communication between two peer applications in different address realms. Host A 110 and Host B 310 are both part of address realm 100. Host A has one or more applications running in it. By way of example, Application A1 121 and Application A2 122 are shown. Each has an internally valid terminating address and internally valid originating address. Host B may also have one or more applications running in it. By way of example, Application B1 321 and Application B2 322 are shown. Host A and Host B may be on the same network or otherwise connected so that there is a channel 370 (e.g., connection to a common communication network) for communication between Host A and Host B. Additional hosts may also be present in this address realm 100 but are not shown.

Improved NAT 320 serves the address realm 100. Improved NAT 320 has two functional sections. One is the address translation section 322, which performs the conventional address translation functions as discussed with respect to NAT 120 in FIG. 2. The other is the address manager section 324. An IP message channel 360 connects Host A 110 to the address translation section. This channel 360 is used when an application on Host A or any other host served by NAT 320 needs to send out an outgoing message and requires internally valid addresses translated into externally valid addresses. The channel 360 is also used when an incoming message has arrived with an externally valid address, the NAT 320 has translated the externally valid addresses in an incoming message into internally valid addresses and needs to send on the message to the appropriate application in address realm 100.

The address translation section 322 is connected to the "outside" address realms. By way of example, FIG. 3 shows a Global Internet realm 400 connected to address translation section 322. Within address realm 400 is another address realm 200 containing Host R 410 and Host S 510 that may host other applications (Applications R1, R2, S1 and S2 are shown by way of example) with which Host A or Host B may communicate. Channel 470 (e.g., a common network connection) provides communication between Host R 410 and Host S 510.

A control channel 350 connects Host A 110 (and indirectly Host B 310) to the address manager section 324. The control channel 350 is used when an application on Host A or any other host served by NAT 320 needs to communicate with NAT 320 to request services of the address manager 324. The address manager can perform several services for a requesting application. First, a requesting application can present an internally-valid address (either an originating address or a terminating address), and ask the address manager 324 to provide an externally valid address paired with the internally valid address and give the address translation section 322 access to this pairing. This can be done so that the address translation section 322 will use this correspondence as its translation rule for incoming and outgoing message packets.

Second, an application may cause the address manager 324 to add additional or more complex translation rules to those used in the NAT 320, going beyond simple internal/external pairings. For example, instead of just performing an unconditional substitution of a corresponding internally-valid destination address or port for a specified externally-valid destination address or port found in an incoming message, a more complex translation rule can be built by the address manager 324 at an application's request. A rule could be formulated so that the address translation section 322 checks the incoming source address and/or port and applies a different translation rule depending on the content of that field. E.g., externally valid address $A_E$ in a packet received at NAT 320 is translated into internally valid address $A_{11}$, if a certain source address is present in the packet; but no translation is done and the packet is discarded if that source address is not present. This may be useful for security. Alternatively, an externally valid destination port number $P_E$ could be translated into an internally valid port number of one value $P_{11}$, or a different value $P_{12}$ depending on the incoming source address. Specific remote addresses, larger sets of remote addresses, or any remote source address at all could be used as the triggers for the use of special NAT rules.

Third, an application could specify to the address manager 324 required or desired characteristics for an externally-valid address requested for association with an internally-valid address. This could he useful to let an application specify that the external IP address to result from translation must be a particular IP address or within a specified range of IP addresses. Thus, with an appropriate request, the application could establish a NAT rule that would require that the message packet be directed or forced to a particular external server in the public Global Internet that, in turn, would direct the message to a particular private network where a certain type of transmission or billing could occur before the packet was forwarded again into a public Global Internet.

It can be seen then that the control channel 350 and the address manager section 324 represent a flexible facility for providing applications both information that they do not get with a conventional NAT and the power to establish certain translation rules for the address translation section 322 of the NAT. The address manager 324 can be implemented in hardware or software or a combination of both. For example, it may desirable that the address manager 324 have its own microprocessor and memory for storing the code that determines what services and functions are available in response to control messages from an application. It will further be seen that each application that communicates with the address manager 324 requires hardware and/or software that permits requests to be made over the control channel 350 and requested information or status information returned to the application.

III. Sample Peer-to-Peer Interchanges Using the Control Channel

Returning to the above discussion of server and client-relationships, the function of the control channel 350 and communications between an application and the address manager section 324 and address translation section 322 in several different example situations can be explained. Each example is presented in reference to FIG. 3.

Server Address/Port Allocation and Discovery Example:

Host A 110 in address realm 100 starts a micro-server, an Application A1 121 that has the purpose of communicating address information to Host R 410, in address realm 200 outside of address realm 100, which address information Host R 410 can use to connect to the micro-server, Application A1. In order to provide Host R with useful address information, the following steps occur:

1. Application A1 121 contacts the NAT device 320 over the control channel 350 to inform the address manager 324 of the internally valid IP address and port Application A1 is using;
2. Application A1 121 receives from the address manager 324 in return an externally valid IP address and a port number which the NAT device 320 will translate to the internally valid terminating address provided by Application A1 in its request.
3. Application A1 (which we must assume has the ability to address an IP message packet to Host R, Application R1 421) then sends an IP message packet via the address translation section 322 of NAT 320. The data portion of the packet contains the externally valid IP address and a port number to inform Host R 410, Application R1 421 how to send packets to Application A1.
4. Application R1 421 at Host R 410 sends a connection request per the externally valid IP address and a port number Application A1 gave it, which (being correctly addressed to an official IP address) arrives at the NAT 320, where the externally valid address is translated to Application A1's internally valid address and port.
5. NAT 320 sends the reply packet from Application R1 421 on to Application A1 121 on Host A.

Client Address/Port Allocation and Discovery Example:

The external Host R 410 in address realm 200 starts a microserver, e.g., an Application R1 421. Application A1 has the intention of communicating address information to Host R, in address realm 200 outside of address realm 100, which address information Host R can use to validate an incoming connection from Host A. In order to provide Host R 420 with useful address information, the following steps occur:

1. Application R1 421 sends a packet to Host A requiring from Host A, Application A1 121, information about from which IP address and port the connection from Application A1 121 will originate. This originating address information is useful for security and may be required by Application R1 for its own purposes, such as compliance with a communication protocol.
2. Application A1 121 on Host A contacts the NAT device 320 over the control channel 350 to inform the address manager 324 of the internally valid IP address and port Application A1 will use to communicate with the micro-server on Host R.

3. Application A1 121 receives from the address manager 324 in return an externally valid IP address and a port number into which the NAT device 320 will translate the internally valid originating address provided by Application A1 in its request.
4. Application A1 121 (which we must assume has the ability to address an IP message packet to Host R, Application R1) then sends an IP message packet via the address translation section 322 of NAT 320. The data portion of the packet contains the externally valid IP address and a port number to inform Host R, Application R1 421 from what IP address and port packets from Application A1 121 will originate.
5. Application A1 121 then initiates the connection by sending an outgoing packet addressed to Host R, Application R1 421, which packet arrives at the address translation section 322 of NAT device 320.
6. The address translation section 322 of NAT device 320 translates the packet's source address and port (which indicate Application A1's internal IP address and port) to the externally valid version of these (which was passed to Application A1 in step 3 and which Application A1 sent to Application R1 in step 4).
7. The address translation section 322 sends the packet on to Host R, Application R1 with the source information Application R1 now expects.

Server Address/Port Alocation and Discovery with Separate Requestor/Server Example:

In this example, Host A and Host B make use of a communication channel 370 between them. This permits an application on Host A to act as a proxy for an application on Host B. For example, if applications on Host B are IP telephones without much intelligence, then Host A could be a virtual PBX with applications that could address a variety of services (e.g., directory assistance, telephone number to IP address association) needed by an IP telephone or could be some other form of IP telephony gateway. With the use of a proxy, it is evident that there need be no relationship between the addresses and ports actually owned or used by the requesting entity, and those addresses and ports called out in the requests to the address manager 324.

Host B 310 in address realm 100 starts a micro-server, e.g., an Application B1 321 that has the purpose of communicating address information to Host R, in address realm 200 outside of address realm 100, which address information Host R (which will act as the client) can use to connect to the micro-server, Application B1 . In order to provide Host R with useful address information, the following steps occur:

1. Application A1 121 communicates with Application B1 over channel 370 to discover what internally valid address and port can be used to contact Application B1 321.
2. Application A1 121 needs to contact Application R1 in address realm 200 to provide Application R1 externally valid address information for Application B1.

Application A1 contacts the NAT device 320 over the control channel 350 to inform the address manager 324 of the internally valid IP address and port Application B1 is using;

3. Application A1 121 receives from the address manager 324 in return an externally valid IP address and a port number which the NAT device 320 will translate to the internally valid terminating address for Application B1 provided by Application A1 in its request.
4. Application A1 121 (which we must assume has the ability to address an IP message packet to Host R, Application R1 421) then sends an IP message packet via the address translation section 322 of NAT 320. The data portion of the packet contains the externally valid IP address and a port number to inform Host R, Application R1 421, how to send packets to Application B1 321.
5. Application R1 421 at Host R sends a connection request per the externally valid IP address and a port number Application A1 121 gave it, which (being correctly addressed to an official IP address) arrives at the NAT 320, where the externally valid address is translated to Application B1's internally valid address and port.
6. NAT 320 sends the reply from Application R1 on to Application B1 on Host B.

Client Address/Port Allocation and Discovery With Client/Servers Separated From Negotiating Entities Example:

In this example, Host R 410 and Host S 510 make use of a communication channel 470 between them. This permits an application on Host R 410 to act as a proxy for an application on Host S 510 . For example, if applications on Host S are IP telephones without much intelligence, then Host R 410 could be a virtual PBX with applications that could address a variety of services (e.g., directory assistance, telephone number to IP address association) needed by an IP telephone or could be some other form of IP telephony gateway.

Host S 510 in address realm 100 starts a micro-server, e.g., an Application S1. Application B1 has the intention of communicating address information to Host S 510, in address realm 200 outside of address realm 100, which address information Host S 510 can use to validate an incoming connection from Host B. In order to provide Host S 510 with useful address information, the following steps occur:

1. Application R1 421 sends a packet to Host A 110 requiring from Host A, Application A1 121 information about from which IP address and port the connection with Application B1 321 will originate. This originating address information is useful for security and may be required by Application S1 for its own purposes, such as compliance with a communication protocol
2. Application A1 121 communicates with Application B1 321 over channel 370 to discover what internally valid address and port will be used by Application B1 321 to contact Application S1 521.
3. Application A1 121 on Host A contacts the NAT device 320 over the control channel 350 to inform the address manager 324 of the internally valid IP address and port Application B1 will use to communicate with the micro-server on Host S 510.
4. Application A1 121 receives in return from the address manager 324 an externally valid IP address and a port number into which the NAT device 320 will translate the internally valid originating address provided by Application A1 121 in its request.
5. Application A1 121 (which we must assume has the ability to address an IP message packet to Host R, Application R1 421) then sends an IP message packet via the address translation section 322 of NAT 320. The data portion of the packet contains the externally valid IP address and a port number to inform Host R, Application R1 421 from what IP address and port packets from Application B1 321 will originate.
6. Application R1 421 will communicate with Application S1 521 via communication channel 470 to communicate to Application S1 521 the IP address and port Application B1 321 will use to communicate to Application S1 521.
7. Application B1 321 then initiates the connection by sending an outgoing packet addressed to Host S, Application S1 521, which packet arrives at the address translation section 322 of NAT device 320.

8. The address translation section 322 of NAT device 320 translates the packet's source address and port (which indicate Application B1's internal IP address and port) to the externally valid version of these (which was passed to Application A1 121 in step 4 and which Application A1 sent to Application R1 421 in step 5.
9. The address translation section 322 sends the packet via Host R 410 on to Host S, Application S1 521 with the source information Application S1 now expects.

IV. A Voice Communication Application

A. Without NAT

To explain in greater detail the application of the present invention to IP telephony it is helpful to explain how a simple phone call using a protocol called SIP might work. SIP is the Session Initiation Protocol, but is a generally accepted shorthand for SIP and all the related protocols that work together to allow users to do telephony (and some other things) over data networks, like IP.

In a simple example, there are basically two messages that get sent to establish a phone call. (This discussion suppresses certain detail; there may in fact be quite a bit more going on.) The two messages we are concerned with are the INVITE message, and the OK response to it.

Assume that someone, using a SIP telephone designated Phone A wishes to make a telephone call to someone else, possibly identified by a telephone number, or some other identifier such as an email address. The person making the call would enter the desired target party by typing in the phone number or other identifier. Of course, Phone A doesn't know anything about where the target party is, but it does know where a smarter device called a proxy server is. Phone A therefore formulates an INVITE message which includes information about who the target is, some other information and—significantly—destination information about where Phone A expects to receive media packets from the target whenever the target is located, rung, and picks up the phone. Phone A will typically supply this information in the form of its own IP address, and a port number. Let us imagine that these are 1.1.1.1, and 1111, respectively.

The proxy server contacted by Phone A will probably send the INVITE on to other proxy server devices, following some network search path, until the target is located. At this point, the INVITE message originally formulated by Phone A is delivered to the target, which we will designate as Phone B. Phone B will presumably ring for a while, and (with luck) someone will pick it up. At this point Phone B replies with an OK message, which includes a variety of information, including the destination address at which Phone B expects to receive media. Let's imagine this is IP address 2.2.2.2, port number 2222.

Phone B may begin to send media packets with digitized voice to 1.1.1.1/1111 immediately, because it received this information in the INVITE message. When the OK message returns (through the proxy servers) to Phone A, that phone may begin to send similar media packets to 2.2.2.2/2222. Digital audio data is being sent in both directions at this point, and conversation presumably ensues.

B. With NAT

With a NAT device in the picture, we have three cases to be discussed. In the first case, the target phone is eventually located by the proxy servers inside some NAT device. In the second, the source phone is located inside some NAT device. In the third case, neither phone is located "inside" a NAT device, but the media traffic between them needs to traverse a network located inside a NAT device. In the examples discussed below, all NAT devices are of the kind discuss in FIG. 3.

The various cases may be combined, of course. In general, some proxy server will provide to other proxy servers in the network, as well as to the phones involved, the illusion that there are no NAT devices. Because this can be done successfully, you can actually have many NAT devices working with many proxy servers, each convinced that it is the only NAT, and each convincing the rest of the network that, in effect, "there is no NAT here."

1. Target Phone is Inside a NAT

In this case, the target phone, Phone B, which is inside the address realm of a NAT, will have no problem sending data to the originating phone, because a NAT generally provides things "inside" with the ability to simply send traffic out to anywhere, by addressing it to the outside address. The difficulty is in sorting out what to tell the originating phone, because the target phone is "inside" a NAT, it cannot be reached from the outside without some help from the NAT. The target phone does not use a globally routably IP address; it probably uses a private IP address, an address the rest of the world has no idea how to deliver packets to. Only devices on the target phone's local network can address data to the target phone's actual IP address with any hope of having data delivered to it.

In this case, a proxy server within the target phone's network must be involved. Of course, it will always be involved anyway, because it has responsibility for routing the INVITE to the correct phone within the local network, to complete the call. This proxy server will also process the OK response from the target phone. Remember that the target phone writes its address and port, 2.2.2.2/2222, into this OK message. In this case, 2.2.2.2 is not a useful address for the originating phone, because it is private and only internally valid. The proxy server must, therefore, obtain a different, externally valid address, and replace the address (and possibly port) contained in the OK message before sending it back toward the originating phone.

The proxy server will make a request to the NAT device of the target phone, a "Server Address/Port Allocation/Discovery" request. The NAT will reply with an address and port, say 3.3.3.3/3333, by which devices on the other side (the "outside") of the NAT device may reach a device at 2.2.2.2/2222 (the target phone). The proxy server re-writes the OK message to indicate 3.3.3.3/3333 instead of 2.2.2.2/2222, and sends this new OK message off to Phone A.

Now when Phone B sends a media packet to Phone A it is addressed to 1.1.1.1/1111, and the NAT allows this to work just fine—outbound traffic can be simply addressed to the "right", externally valid address. When Phone A sends a media packet to Phone B, however, it will send it to 3.3.3.3/3333—the destination endpoint information it received in the OK message. Assuming correct configuration, this packet will arrive at the NAT device, which will translate it so that it is now addressed to 2.2.2.2/2222, per the request made by the proxy server, and sent inside the network. The media packet is now correctly addressed, and is within the local network which knows how to deliver this "privately addressed" media packet, so the media packet arrives at Phone B, as desired.

2. Target Phone is Outside the NAT

This is almost exactly the same as the previous example, except that in this case the proxy server near Phone A (which is now the phone "inside" the NAT, and which has a private IP address useful only within its local network) must re-write the INVITE message after querying the NAT device for an externally valid address. Perhaps the 1.1.1.1/1111 address is re-written under the requested NAT rule to 4.4.4.4/4444 (1.1.1.1 is assumed to be a private IP address, while 4.4.4.4 is not, in this case).

A media packet from Phone A proceeds outwards through the NAT device unchanged, while a media packet from Phone B, outside the NAT will be addressed to 4.4.4.4/4444, will arrive at the NAT device and be translated to 1.1.1.1/1111, and finally delivered to Phone A inside.

3. Both Phones Outside—Transit Network has NATs

In this case we assume that both phones are somewhere "out there", and the network with the NAT devices is a transit network—perhaps a long-distance carrier for IP telephones. We assume further that this network is taking part in the processing and routing of INVITE and OK messages. Perhaps this network provides person-location services, as well as media handling.

Let us leave Phone A and Phone B at 1.1.1.1/1111 and 2.2.2.2/2222 respectively.

Assume the INVITE from Phone A arrives at some proxy server in the NAT-equipped transit network under consideration. We may call this the Ingress Proxy Server, because it handles the "inbound" INVITE in our example. The Ingress Proxy Server performs the same "Server Address/Port Discovery" as in the earlier examples, to discover an address that a device inside the transit network could use to reach Phone A. Let us assume that it performs this operation on a specific NAT device, designated NAT A, which is at the egress point from the transit network to Phone A. Say NAT A returns an address/port, which is 10.10.10.10/1010. This is a private address, useful within the transit network, which things inside that transit network could use to reach Phone A. That is, any message packets within the transit network addressed to 10.10.10.10/1010 would be routed by the network to NAT A, which would translate the addresses to 1.1.1.1/1111. and send them on to Phone A.

The INVITE message (now indicating that Phone A wished to receive media at 10.10.10.10/1010) is sent on across the transit network. At some point, another proxy server which we will call the Egress Proxy Server because it will handle the INVITE on the way out of the transit network, will receive this INVITE. This Egress Proxy Server will perform yet another request, on another NAT device (say, NAT B) well situated to provide traffic to and from Phone B, to discover an address by which things "outside" NAT B may reach the end point currently contained in the INVITE—10.10.10.10/1010. NAT B should respond with some address, say 20.20.20.20/2020. The point of this address is that packets sent by things outside (say, for example, Phone B) addressed to 20.20.20.20/2020, arriving at NAT B, will be re-addressed, specifically, translated to be addressed to 10.10.10.10/1010. Then the transit network will route this data (because it's set up to route this way) to NAT A, which will re-address the data again to 1.1.1.1/1111 as indicated in the previous paragraph.

The INVITE is then sent on to Phone B, which will send media packets to address 20.20.20.20/2020, per the contents of the INVITE. The media packets will travel to address 20.20.20.20, which will, assuming correct network configuration, cause it to arrive at NAT B, where it will be translated to 10.10.10.10/1010, and thence to NAT A. NAT A will translate it to 1.1.1.1/1111, and send it on to Phone A.

Exactly the same set of operations, though resulting in different addresses, will apply to the OK coming back from Phone B, but in the opposite direction. First the Egress Proxy Server will ask NAT B for an address by which things inside the transit network may reach Phone B (at 2.2.2.2/2222). Perhaps NAT B will return the address 40.40.40.40/4040. The OK message will be re-written by the Egress Proxy Server to indicate this, and be sent on to the Ingress Proxy Server. This Proxy Server will ask NAT A for an address by which things outside (say, Phone A) may reach address 40.40.40.40/4040. NAT A might return the address 50.50.50.50/5050. The OK will be re-written again to indicate this, and be sent on to Phone A, which will then send all its media packets to address 50.50.50.50/5050.

The upshot is that Phone B sends its media packets to 20.20.20.20/2020, and Phone A will send its media packets to 50.50.50.50/5050, and all the addresses eventually get translated so that the media packets arrive at the right place at the end of the day.

The advantages of doing this are that IP addresses such as 20.20.20.20 and 50.50.50.50 can be forced by applications that the ability to control a NAT and selected to be addresses that belong to the transit network itself, guaranteeing that the packet from the two phones arrive at suitable ingress points to the transit network itself, guaranteeing that the transit network actually handles the media data, and furthermore guaranteeing the ingress point for each media stream. Without this, there is no way the transit network has a priori control over how the media packets get from one of the phones to the other.

IV. Conclusion and Aternate Embodiments

It will be readily apparent to those skilled in the art that innumerable variations, modification, applications, and extensions of these embodiments and principles can he made without departing form the principles and spirit of the invention. Accordingly, it is intended that the scope of the invention be only limited as necessitated by the accompanying claims.

What is claimed is:

[1. A network address translation device for facilitating message packet communication between a first application having an internal address valid in an internal address realm and one or more applications in an external address realm, said internal address realm having available to it a set of available addresses valid for use in the external address realm, comprising:

an address translator for translating addresses included in the headers of message packets incoming to and outgoing from the internal address realm in accordance with translation rules that resolve the incompatibility of the internal and external address realms;

an address manager for establishing and storing the translation rules, said address manager having access to the set of available addresses valid for use in the external address realm; and a control channel communicating with the address manager for receiving from the first application a service request message for establishing in response to the first application's service request a translation rule specified by the first application.]

[2. The network address translation device of claim 1, wherein the first application specifies that the translation rule to be established associates the first application's internal address with an available external address and the first application has access to the associated available external address as data for an outgoing message packet.]

[3. The network address translation device of claim 1 wherein the first application specifies that the translation rule to be established associates the first application's internal address with an available external address that is a particular IP address or within a specified range of IP addresses.]

[4. The network address translation device of claim 1 wherein the first application specifies that the translation rule is one of two or more translation rules applicable to an incoming message packet, where the selection of which translation rule is applied is contingent on address information in the incoming message packet.]

[5. The network address translation device of claim 2 wherein the available external address requested by the first application is a terminating address.]

[6. The network address translation device of claim 2 wherein the available external address requested by the first application is an originating address.]

[7. The network address translation device of claim 2 wherein the internal address realm is a private network and the external address realm is the Internet.]

[8. The network address translation device of claim 1 wherein the internal address realm is a private network and the external address realm is the Internet and the address manager establishes a translation rule by associating an address valid in the private network realm with an address valid in the Internet.]

[9. The network address translation device of claim 4, wherein the selection of which translation rule is applied is made in response to the presence or absence of specified originating address information in the incoming message.]

[10. The network address translation device of claim 1, wherein the communication facilitated is peer-to-peer application communication.]

[11. The network address translation device of claim 1, wherein the communication facilitated is peer-to-peer telephony communication.]

[12. The network address translation device of claim 3, wherein the translation rule to be established forces the outgoing message packet to have a destination address in a transit network.]

[13. The network address translation device of claim 3, wherein the translation rule to be established forces at least a portion of the packet communication between the first application and the second application to pass through a specified network.]

[14. A method for facilitating message packet communication between a first application having an internal address valid in an internal address realm and one or more applications in an external address realm, said internal address realm having available to it a set of addresses valid for use in the external address realm, comprising:

providing the internal address realm with a network address translation device having an address translator for translating addresses included in the headers of message packets incoming to and outgoing from the internal address realm in accordance with translation rules that resolve the incompatibility of the internal and external address realms;

providing an address manager for establishing and storing the translation rules, said address manager having access to the set of available addresses valid for use in the external address realm; and providing a control channel communicating with the address manager for receiving from the first application a service request message for establishing in response to the first application's service request a translation rule specified by the first application.]

[15. The method of claim 14, wherein the step of providing a control channel comprises receiving from the first application a request that specifies that the translation rule to be established associates the first application's internal address with an available external address and providing the first application access to the associated available external address as data for an outgoing message packet.]

[16. The method of claim 14 wherein the step of providing a control channel for receiving a request comprises receiving from the first application a request that specifies that the translation rule to be established associates the first application's internal address with an available external address that is a particular IP address or within a specified range of IP addresses.]

[17. The method of claim 14 wherein the step of providing a control channel for receiving a request comprises receiving from the first application a request that the translation rule is one of two or more translation rules applicable to an incoming message packet, where the selection of which translation rule is applied is contingent on address information in the incoming message packet.]

[18. The method of claim 14 wherein the step of providing a control channel for receiving a request comprises receiving from the first application a request for a translation rule for a terminating address.]

[19. The method of claim 14 wherein the step of providing a control channel for receiving a request comprises receiving from the first application a request for a translation rule for an originating address.]

[20. The method of claim 14 wherein the internal address realm is a private network and the step of providing an address manager comprises providing an address manager having access to a set of available addresses valid in the Internet.]

[21. The method of claim 14 wherein the internal address realm is a private network and the external address realm is the Internet and the step of providing an address manager comprises providing an address manager that establishes a translation rule by associating an address valid in the private network realm with an address valid in the Internet.]

[22. The method of claim 17, wherein step of providing a control channel for receiving a request comprises receiving from the first application a request that the translation rule is one of two or more translation rules applicable to an incoming message, where the selection of which translation rule is applied is made in response to the presence or absence of specified originating address information in the incoming message.]

[23. The method of claim 14, wherein the communication facilitated is peer-to-peer application communication.]

[24. The method of claim 14, wherein the communication facilitated is peer-to-peer telephony communication.]

[25. The method of claim 16, wherein the step of providing a control channel for receiving a request comprises receiving from the first application a request that the translation rule to be established forces the outgoing message packet to have a destination address in a transit network.]

[26. The method of claim 16, wherein step of providing a control channel for receiving a request comprises receiving from the first application a request that the translation rule to be established forces at least a portion of the packet communication between the first application and the second application to pass through a specified network.]

*27. A method for facilitating message packet communication between a first application having an internal address valid in an internal address realm and one or more applications in an external address realm, said internal address realm having available to it a set of addresses valid for use in the external address realm, comprising:*

*receiving a service request at a network address translation device from a second application acting as a proxy for the first application, wherein the network address translation device has an address translator for translating addresses included in the headers of message packets incoming to and outgoing from the internal*

*address realm in accordance with at least one translation rule that maps correspondence between addressing in the internal and external address realms; and*

*responsive to the service request from the second application acting as a proxy and providing the internal address of the first application received by the network address translation device, establishing a translation rule specified by the service request that provides for the first application an external address realm address paired with the first application's internal address to use in an outgoing message to facilitate an incoming message from an application in the external address realm.*

*28. The method of claim 27, wherein the message packet communication is communication of media packets.*

*29. The method of claim 27, wherein the message packet communication is communication of digitized audio packets.*

*30. The method of claim 27, wherein the first application is an application running on a telephone.*

*31. The method of claim 27, wherein the second application acting as a proxy is a virtual PBX.*

*32. The method of claim 27, wherein the first application is an application for instant messaging.*

*33. The method of claim 27, wherein the external address realm address includes an externally valid IP address and port number, which the address translator will translate into an internally valid IP address and port number of the internal address for the first application.*

*34. The method of claim 27, wherein the second application receives from the address translator the external address realm address.*

*35. The method of claim 34, further comprising the step of providing, in a data portion of a message from the second application, the external address realm address to the application in the external address realm, whereby the application in the external address realm can initiate communications with the first application by addressing messages to the external address realm address.*

*36. The method of claim 34, further comprising the step of providing, in a data portion of a message from the second application, the external address realm address to a third application acting as a proxy for the application in the external address realm, whereby the application in the external address realm can initiate communications with the first application by addressing messages to the external address realm address.*

*37. The method of claim 27, wherein the translation rule pairing the external address realm address with the first application's internal address defines a first translation rule; the outgoing message initiates communications with the application in the external address realm; and the incoming message from the application in the external address realm, addressed to the external address realm address that the network address translation device will translate according to the first translation rule, is in response to such first application initiated communications; and further comprising the steps of:*

*establishing at the network address translation device a second translation rule in response to the same or a further service request from the second application providing a second internally valid address for the first application, the second translation rule including a second externally valid address paired with the second internally valid address; and*

*providing, in a data portion of a message from the second application, the second externally valid address to the application in the external address realm, whereby the application in the external address realm can initiate communications with the first application by addressing messages to the second externally valid address.*

*38. The method of claim 27, wherein the first application and the application in the external address realm are peer-to-peer applications, which communicate in an essentially symmetric fashion.*

*39. The method of claim 38, wherein each peer-to-peer application functions as a client and a server.*

*40. A method for facilitating message packet communication between an internal address realm and an external address realm, comprising:*

*receiving at a network address translation device a service request from a second application acting as a proxy on behalf of a first application having an internal address valid in the internal address realm, wherein the network address translation device has an address translator for translating addresses included in the headers of message packets incoming to and outgoing from the internal address realm in accordance with at least one translation rule that maps correspondence between addressing in the internal and external address realms;*

*establishing at the network address translation device a translation rule with respect to the service request from the second application acting as a proxy for providing the internal address of the first application, the translation rule including an external address valid for use in the external address realm and paired with the first application's internal address to use in an outgoing message to facilitate an incoming message from an application in the external address realm; and*

*providing, in a data portion of a message from the second application, the external address to which messages from the application in the external address realm are to be sent for communicating with the first application.*

*41. The method of claim 40, wherein the message packet communication is communication of media packets.*

*42. The method of claim 40, wherein the message packet communication is communication of digitized audio packets.*

*43. The method of claim 40, wherein the first application is an application running on a telephone.*

*44. The method of claim 40, wherein the second application acting as a proxy is a virtual PBX.*

*45. The method of claim 40, wherein the first application is an application for instant messaging.*

*46. The method of claim 40, wherein the first application and the application in the external address realm are peer-to-peer applications that communicate in an essentially symmetric fashion.*

*47. The method of claim 46, wherein each peer-to-peer application functions as a client and a server.*

*48. The method of claim 40, wherein the external address comprises an externally valid IP address and port number, which the network translator will translate into an internally valid IP address and port number of the internal address for the first application.*

*49. The method of claim 40, wherein the application in the external address realm can initiate communications with the first application by addressing messages to the external address.*

*50. The method of claim 40, wherein the message having the external address in the data portion thereof is provided to a third application acting as a proxy on behalf of the application in the external address realm.*

*51. A method for facilitating message packet communication between a first application in an internal address realm and one or more applications in an external address realm, said internal address realm having available to it at least one*

*address valid for use in the external address realm, and an address translator translating addresses included in headers of message packets incoming to and outgoing from the internal address realm in accordance with translation rules that map correspondence between addressing in the internal and external address realms, the method comprising the steps of:*

*sending from a second application, acting as a proxy on behalf of the first application, a service request for establishing a new translation rule at the address translator, the service request specifying an internal address associated with the first application to be mapped with an external address from the at least one address valid for use in the external address realm; and*

*receiving the external address at the second application acting as a proxy on behalf of the first application for message packet communication.*

*52. The method of claim 51 wherein the service request specifies a required or desired characteristic for the external address to be established in the new translation rule.*

*53. The method of claim 52, wherein the required or desired characteristic specifies that the external address of the new translation rule must be a particular address or in a specified range of IP addresses.*

*54. The method of claim 51, wherein the second application acting as a proxy is a virtual PBX.*

*55. The method of claim 51, further comprising, providing, in a data portion of a message from the second application, the external address to which messages from the application in the external address realm are to be sent for communicating with the first application.*

*56. The method of claim 55, wherein the message providing the external address in the data portion thereof is provided to a third application acting as a proxy on behalf of the application in the external address realm.*

*57. A method for facilitating message packet communication between an internal address realm and an external address realm, comprising:*

*receiving at a network address translation device a service request from a first application having an internal address valid in the internal address realm, wherein the network address translation device has an address translator for translating addresses included in the headers of message packets incoming to and outgoing from the internal address realm in accordance with at least one translation rule that maps correspondence between addressing in the internal and external address realms and wherein the step of receiving at a network address translation device a service request comprises receiving a request communicated from a proxy server;*

*establishing at the network address translation device a translation rule with respect to the service request from the first application, the translation rule including an external address valid for use in the external address realm and paired with the first application's internal address to use in an outgoing message to facilitate an incoming message from an application in the external address realm; and*

*providing the external address to the first application.*

* * * * *